Patented Jan. 30, 1940

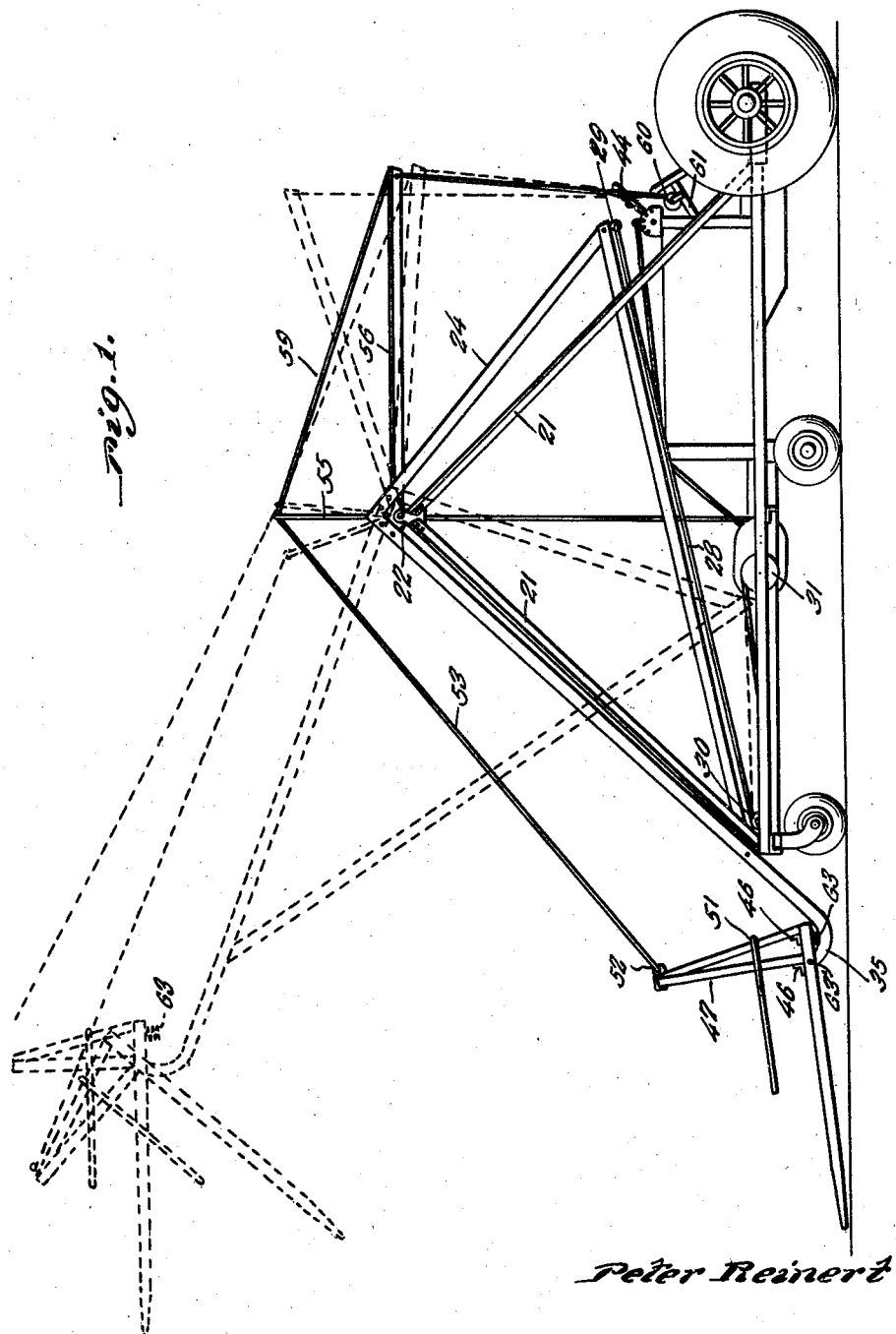

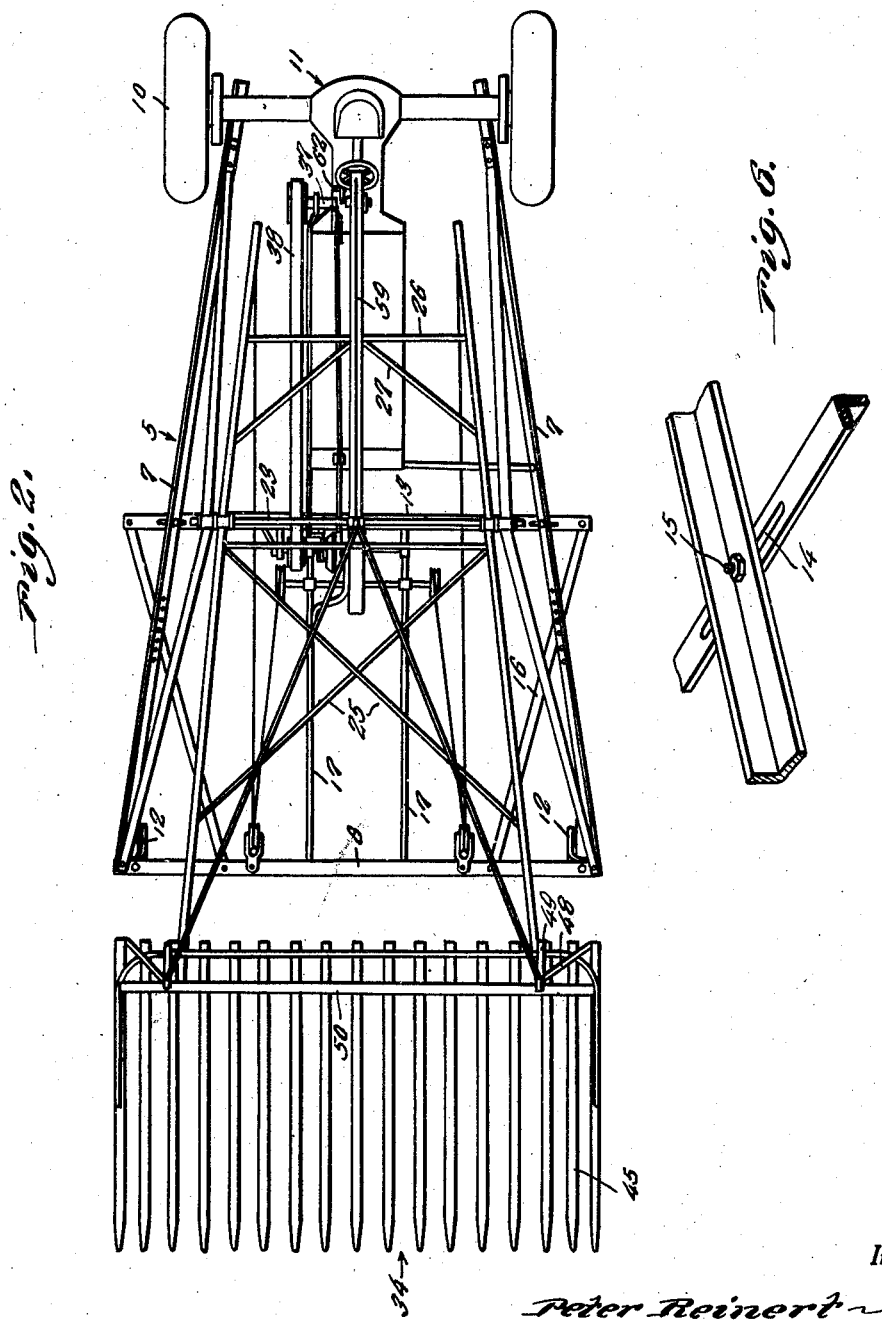

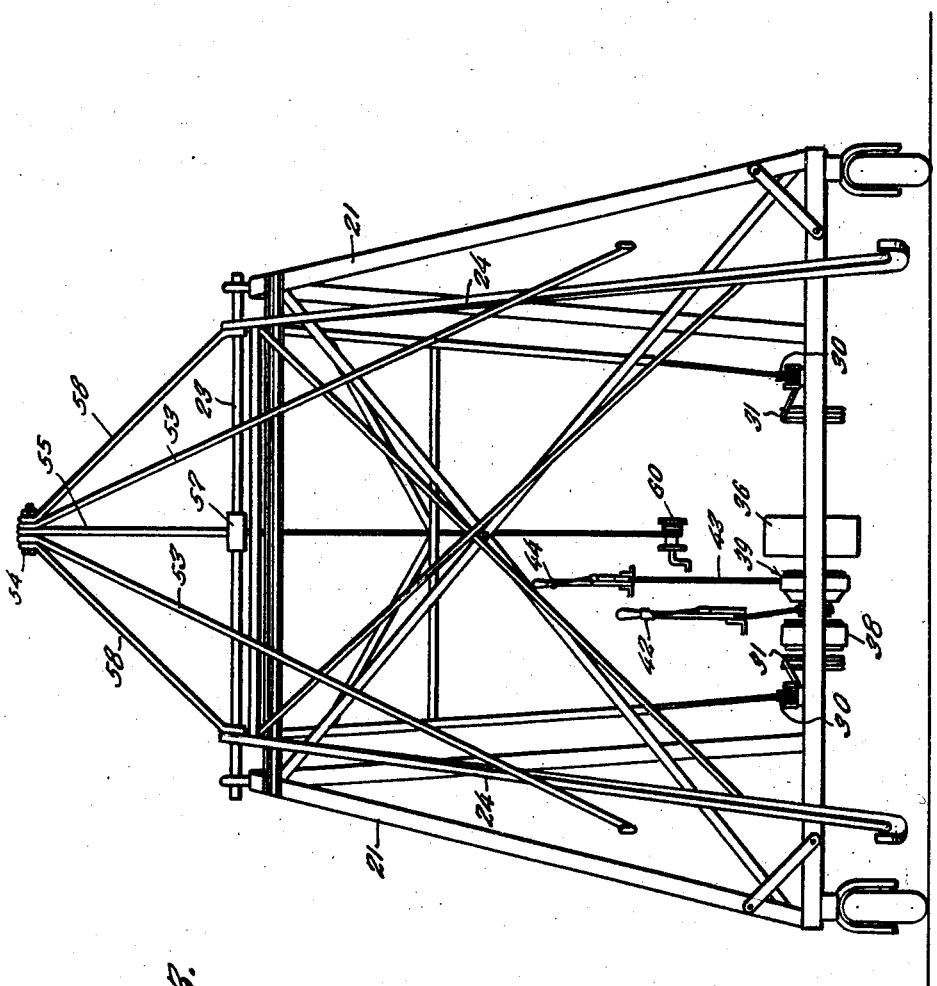

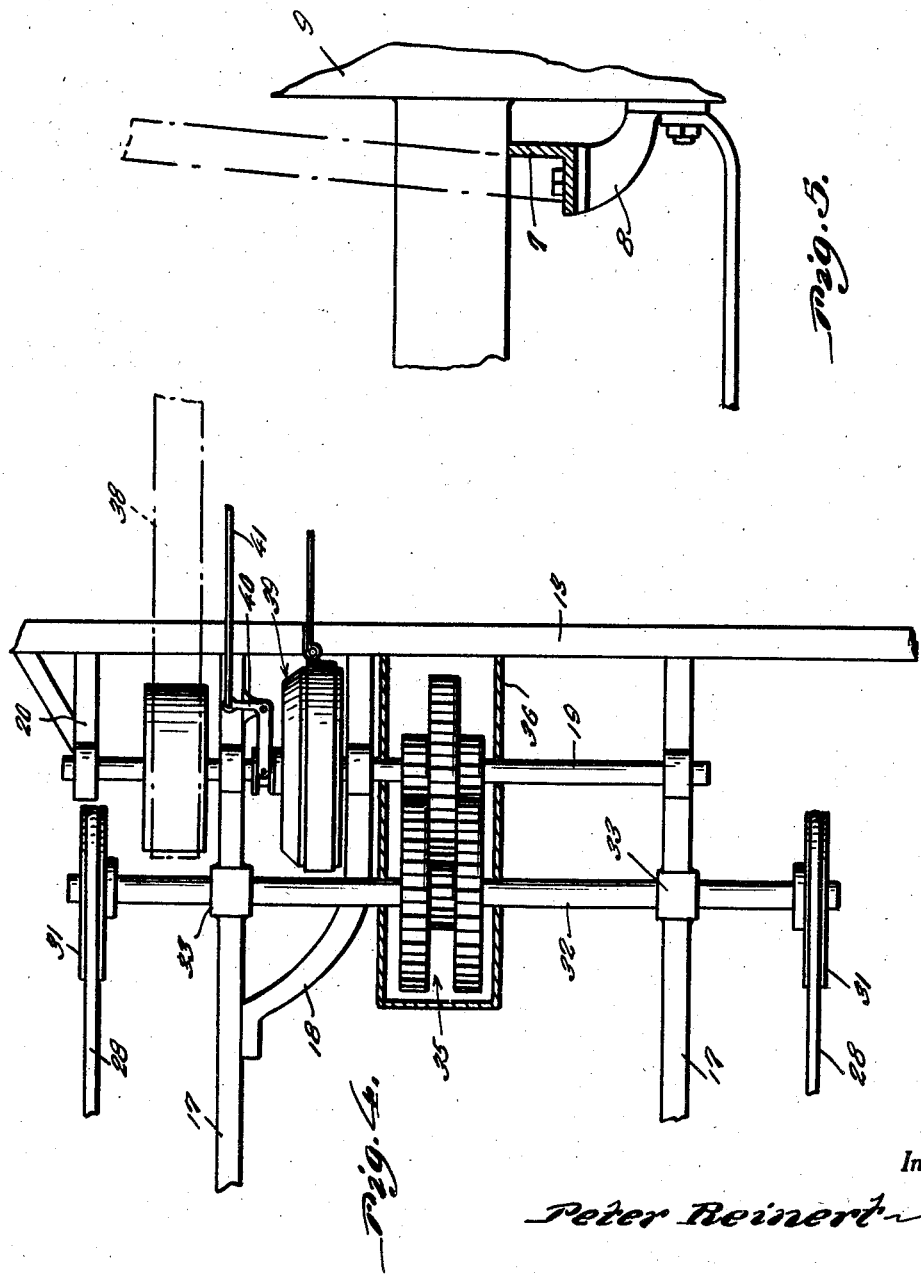

2,188,724

UNITED STATES PATENT OFFICE 2,188,724

COMBINATION BUCK STACKER AND LOADER

Peter Reinert, Cherokee, Iowa

Application February 14, 1939, Serial No. 256,342

4 Claims. (Cl. 214—140)

This invention relates to a combination buck stacker and loader and an object of the invention is to provide a device of this character which may be also used, in addition to its use for loading hay, straw, and bundles of all kinds, as a loader for manure, gravel, and dirt, and also as a simple hoist and/or derrick.

A further object of the invention is to provide a device of this character which may be readily connected with a farm tractor.

The invention together with its objects and advantages will be best understood from a study of the following description taken in connection with the accompanying drawings wherein:

Figure 1 is a side elevational view of the device.

Figure 2 is a top plan view thereof.

Figure 3 is a front elevational view of the device with certain parts removed.

Figure 4 is a fragmentary top plan view showing a cable-drum, clutch and brake assemblies.

Figure 5 is a fragmentary detail elevational view illustrating certain details hereinafter more fully referred to.

Figure 6 is a fragmentary perspective view showing the manner of connecting one of the side rails of the frame with a cross bar also forming part of the frame.

Referring to the drawings by reference numerals it will be seen that the device comprises a frame 5. The frame 5 includes a cross bar 6 to the opposite ends of which are pivoted one end of side rails 7 which at the free ends thereof are adapted to be bolted or otherwise secured to brackets 8 suitably mounted on the gear housings 9 of the rear wheels 10 of a conventional farm tractor 11. At the front end of the frame 5 the latter is supported by swivelled wheels 12 disposed adjacent the opposite ends of the bar 6 of the frame.

The bars 7 are adjustable laterally relative to one another as required by the spacing of the wheels 10 of the tractor, and bars 7 are secured at the proper position of adjustment, and are braced relative to one another through the medium of a cross bar 13 that is provided with slots 14 that receive nut-equipped bolts 15 extending through the side members of the frame for securing the side bars 7 and cross bar 13 fixed relative to one another.

Cross bar 13 is also braced with respect to the front bar 6 of the frame through the medium of brace bars 16. Brace bars 16 are provided with apertures adapted to register with selected apertures arranged in series on the bars 7 to accommodate bolt and nut means through the medium of which the brace bars 16 are positively secured to the side members 7 of the frame.

Extending between the cross bar 13 and the front member 6 of the frame are rods 17. As shown in Figure 4 one of the rods 17 is braced with respect to the cross bar 13 through the medium of a brace member 18.

Rod 17 and brace 18 are provided with bearings in which is journaled a shaft 19 one end of which is also journaled in the bearing of a bracket 20 suitably mounted on the cross bar 13. The purpose of the shaft 19 will be hereinafter more fully explained.

Rising from the side bars 7 of the frame 5 are standards 21 which at their upper ends are provided with brackets 22 that support a fixed shaft 23.

Mounted on the shaft 23 to rotate on the shaft as an axis is a rocker which includes a pair of opposed substantially triangular frames 24. Frames 24 are connected together and braced relative to one another through the medium of cross bars 25, at the front side of the rocker and by a cross bar 26 and diagonal brace bars 27 at the rear end of the rocker.

For rocking the aforementioned rocker there are provided cables 28 which at one end are connected with the frame members 24 of the rocker, at the rear lower corners of said frame members as at 29. The cables 28 are trained over pulleys 30 provided on the bar 6 of the frame and windable on drums 31 mounted on the ends of a shaft 32 journaled in suitable bearings 33 provided therefor on the aforementioned rods 17 as shown in Figure 4. Thus it will be seen that as the cables 28 wind on the drums 31 the rocker member will be caused to rock in a clockwise direction from the full line position shown in Figure 1, to raise the fork 34 pivoted to the terminal extensions 35 of the frames 24. Thus in this manner is the fork 34 quickly raised for emptying the material thereon into a wagon or the like.

Drive from the shaft 19 to the shaft 32 for swinging the rocker in the manner just described is transmitted through the medium of suitable gearing 35 housed within a suitable casing 36 provided therefor and mounted on the frame bar 13.

Also drive is transmitted to the shaft 19 from the power take-off shaft 37 of the tractor through the medium of a suitable belt and pulley drive connection 38.

Also, for the shaft 19 there is provided a combination clutch and brake assembly 39 and the clutch part of the assembly 39 has the clutch shifting bell crank 40 thereof connected through the medium of a suitable link 41 with a control lever 42 suitably provided on the tractor within convenient reach of the driver of the tractor. Also the band of the brake portion of the assembly 39 is connected through the medium of a suitable link 43 with a hand lever 44 provided therefor and also mounted on the tractor within convenient reach of the operator.

The levers 42, 44 are provided with suitable detents cooperable with rack segments for securing the levers at the desired position of adjustment.

The fork 34 is of somewhat conventional structure being composed of tines 45 secured in suitably spaced relation through the medium of angle bars 46.

Rising from the endmost tines 45 are standards 47, and each standard 47 is suitably braced through the medium of braces 48 and 49. The standards 47 at their upper ends are connected by a bar 50 as shown.

Secured to the standards 47 and spaced above the tines 45 is a guard rail 51 that is substantially U-shaped and has the legs thereof extending above and parallel to the endmost tines as shown.

Provided on the bar 50 adjacent opposite ends of the bar are eyes 52 with which are engaged the hook ends of rods 53.

Rods 53 converge at one end and at said converging end are connected through the medium of bolt and nut means 54 with the upper end of the vertical arm 55 of a rocking lever which at the angle of the arms 55, 56 thereof, is provided with a hub or sleeve 57 that is rockable on the rod or shaft 23. Also the arm 55 of said L-shaped lever is braced with respect to the rod 53 and the hub 57 held in centered position on the rod or shaft 53 through the medium of brace members 58.

Suitably connected with the upper end of the arm 55 is a cable 59 that is threaded through a suitable opening provided therefor in the free end of arm 56 and is windable on a drum 60 suitably provided therefor and mounted on the steering post 61 of the tractor as shown. For the drum 60 there is provided a suitable crank handle 62.

In connection with the above it will be understood that as the rocker is rocked in the direction hereinbefore noted to raise the rake 34 the operator turns the crank 62 associated with drum 60 for winding the cable 59 on the drum to thereby maintain the cable taut during the raising of the rake. When the rake has been raised to the dotted position shown in Figure 1 the operator then releases the crank 62 so that the rake in response to gravity and the weight of the material thereon will then swing downwardly on its pivot 63 to the dotted line position suggested in Figure 1 for discharging the material thereon into a wagon or the like. After the material has thus been discharged from the rake the clutch of the assembly 39 is released as is also the brake of said assembly so that the shaft 32 will be free to rotate for paying out the cables 28 and thus permit the rocker together with the rake pivoted thereon to return to the normal position or to the full line position shown in Figure 1.

At the rear end thereof the endmost tines of the rake are provided with cushion springs 63, which engage the ends 35 of the frame members 24 of said rocker member when the rake is returned to its normal position, and serve to cushion the shock incidental to the return of the rake to said position.

It is thought that a clear understanding of the construction, operation, manner of using, utility and advantages of an invention of this character will be had without a more detailed description thereof except to state that obviously when the device is to be used as a manure loader the tines of the fork or rake will be spaced closer together than is the case when the device is used as a hay loader.

Having thus described the invention what is claimed as new is:

1. In a loader of the character described, a supporting structure, a rocker member mounted on said supporting structure, said rocker member including forwardly extending members having their front ends curving upwardly, a rake pivoted to said front ends and having parts extending rearwardly of the pivotal points and located over the curved parts of said forwardly extending members, springs between said rearwardly extending parts of the rake and the curved portions of the forwardly extending members, means for rocking said rocker member for raising and lowering said rake, and means for releasably retaining the rake in a load-retaining position relative to said rocker member, said means being quickly releasable to permit the rake to swing relative to the rocker for discharging the contents of the rake.

2. In a loader of the character described, a wheel-supported frame adapted to accommodate between the sides thereof a tractor and to be secured to the tractor to extend laterally and forwardly of the tractor, standards mounted on the frame at opposite sides of the latter, a fixed rod supported between said standards, a rocker mounted on the rod to rock relative thereto, drums mounted on said frame, pulleys mounted on the frame at one end of the latter, cables windable on the drums and connected at one end to the rocker, said cables being trained over said pulleys and serving incidental to the winding thereof on the drums to rock said rocker in one direction, a rake pivoted to the rocker at one end of the latter to swing with the rocker, a back upright frame for the rake, a bell crank lever mounted on said rod to rotate relative to the rod as an axis, said lever having one part extending upwardly and the other part extending rearwardly, link members connecting said upwardly extending part of the lever with the back frame of the rake, a drum mounted on the tractor, and a cable connected with said upper part of the lever and passing through a hole in the rear end of the rearwardly extending part of the lever and windable on the last-mentioned drum in a manner to hold the rake in a load-retaining position relative to the rocker incidental to a rocking of the rocker in a direction to elevate the rake.

3. In a loader of the character described, a wheel-supported frame adapted to accommodate between the sides thereof a tractor and to be secured to the tractor to extend laterally and forwardly of the tractor, standards mounted on the frame at opposite sides of the latter, a fixed rod supported between the upper ends of said standards, a substantially triangular-shaped rocker frame mounted at its upper corner on the rod to rock relative to said rod, drums mounted on said frame, pulleys mounted on the frame at one end of the latter, cables windable on the drums and connected at one end to the rocker frame, said cables being trained over said pulleys and serving incidental to the winding thereof on the drums to rock said rocker frame in a direction to raise the front end thereof, a rake pivoted to the front end of the rocker frame to swing with the rocker frame, a bell crank lever mounted on said rod to rotate relative to the rod as an axis, said bell crank lever having a part extending upwardly from the rod and another part extending rearwardly and said rearwardly extending part having a hole at its rear end, link members connecting said upwardly extending part of the lever with the rake, said rake having an upstanding rear part to which said link members are connected, a drum mounted on the tractor, a cable connected with said upwardly extending part of the bell crank lever and passing through the hole in the horizontal part of the lever and windable on the drum in a manner to hold the rake in a load-retaining position relative to the rocker frame incidental to a rocking of the rocker frame in a direction to elevate the rake, and means for driving the first-mentioned drums from the power take-off shaft of the tractor, said driving means including a shaft, gearing connecting the shaft with the first-mentioned drums, and a clutch and brake assembly connected with said shaft for controlling the drive connection between the shaft and the power take-off shaft of the tractor and also for retarding rotation of the shaft.

4. In a loader of the character described, a wheel-supported frame adapted to accommodate between the sides thereof a tractor and to be secured to the tractor to extend laterally and forwardly of the tractor, standards mounted on the frame at opposite sides of the latter, a fixed rod supported between said standards, a rocker mounted on the rod to rock relative thereto, drums mounted on said frame, pulleys mounted on the frame at one end of the latter, cables windable on the drums and connected at one end to the rocker, said cables being trained over said pulleys and serving incidental to the winding thereof on the drums to rock said rocker in one direction, a rake pivoted to the rocker at one end of the latter to swing with the rocker, a lever mounted on said rod to rotate relative to the rod as an axis, link members connecting said lever with the rake, a drum mounted on the tractor, and a cable connected with said lever and windable on the drum in a manner to hold the rake in a load-retaining position relative to the rocker incidental to a rocking of the rocker in a direction to elevate the rake, and said frame including side rails laterally adjustable relative to one another and having free ends adapted to be secured to the tractor for positively connecting the frame with the tractor.

PETER REINERT.